(12) United States Patent
Li

(10) Patent No.: US 10,551,894 B2
(45) Date of Patent: Feb. 4, 2020

(54) DYNAMIC POWER MANAGEMENT IN A HYBRID DUAL BATTERY SYSTEM

(71) Applicant: Microsoft Technology Licensing, LLC, Redmond, WA (US)

(72) Inventor: Xiaobei Li, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 15/342,848

(22) Filed: Nov. 3, 2016

(65) Prior Publication Data

US 2018/0120915 A1 May 3, 2018

(51) Int. Cl.
*G06F 1/32* (2019.01)
*G06F 1/26* (2006.01)
*G06F 1/3212* (2019.01)

(52) U.S. Cl.
CPC .......... *G06F 1/3212* (2013.01); *G06F 1/263* (2013.01)

(58) Field of Classification Search
None
See application file for complete search history.

(56) References Cited

U.S. PATENT DOCUMENTS

| | | | |
|---|---|---|---|
| 4,536,696 A | 8/1985 | Ray | |
| 5,541,489 A * | 7/1996 | Dunstan | G01R 31/3624 320/134 |
| 5,684,384 A * | 11/1997 | Barkat | G06F 1/26 307/66 |
| 6,628,011 B2 | 9/2003 | Droppo et al. | |
| 8,493,032 B2 | 7/2013 | Krauer | |
| 9,768,640 B2 * | 9/2017 | Hone | G06F 1/1626 |
| 9,893,389 B2 * | 2/2018 | Yamamoto | H01M 10/482 |
| 2004/0210406 A1 * | 10/2004 | Bui | G06F 1/263 702/63 |
| 2005/0194937 A1 * | 9/2005 | Jacobs | H02J 7/0018 320/135 |
| 2008/0191555 A1 | 8/2008 | Cha | |

(Continued)

FOREIGN PATENT DOCUMENTS

| | | |
|---|---|---|
| CN | 105790348 A | 7/2016 |
| EP | 1030431 A1 | 8/2000 |

OTHER PUBLICATIONS

Ryu, et al., "An optimized design of bi-directional dual active bridge converter for low voltage battery charger", In Proceedings of 16th International Power Electronics and Motion Control Conference and Exposition, Sep. 21, 2014, 177-183 pages.

(Continued)

*Primary Examiner* — Mohammed H Rehman
*Assistant Examiner* — Cheri L Harrington
(74) *Attorney, Agent, or Firm* — Arent Fox LLP

(57) ABSTRACT

The present disclosure provides devices and techniques for managing power distribution in a device. The devices and techniques include determining a first power level of a first battery of the device, and determining a second power level of a second battery of the device. Also, the devices and techniques include adjusting an input current limit of a system charger based on the first power level and the second power level. Additionally, the devices and techniques include steering power from one or both of the first battery or the second battery to at least one processor of the device based on the input current limit.

20 Claims, 8 Drawing Sheets

(56) References Cited

U.S. PATENT DOCUMENTS

| | | | | |
|---|---|---|---|---|
| 2009/0295330 A1* | 12/2009 | Li | ............ | H02J 7/0013 320/124 |
| 2010/0320971 A1* | 12/2010 | Zhu | ............ | H02J 7/0042 320/134 |
| 2011/0260689 A1* | 10/2011 | Kano | ............ | H02J 7/0022 320/128 |
| 2012/0119579 A1* | 5/2012 | Jin | ............ | H02J 3/28 307/60 |
| 2014/0035380 A1* | 2/2014 | Stevens | ............ | H02J 5/005 307/104 |
| 2014/0173305 A1* | 6/2014 | Uan-Zo-Li | ............ | G06F 1/3296 713/320 |
| 2014/0229748 A1* | 8/2014 | Li | ............ | G06F 1/26 713/300 |
| 2014/0265604 A1* | 9/2014 | Mergener | ............ | H02J 7/0063 307/80 |
| 2014/0268556 A1* | 9/2014 | Lam | ............ | G06F 1/1632 361/679.55 |
| 2014/0281591 A1 | 9/2014 | Uan-zo-li | | |
| 2015/0333666 A1* | 11/2015 | Miller | ............ | H02P 4/00 318/139 |
| 2015/0340897 A1* | 11/2015 | Uan-Zo-Li | ............ | H02J 7/0054 320/103 |
| 2015/0357854 A1* | 12/2015 | Watanabe | ............ | H02J 3/24 320/134 |
| 2015/0372613 A1* | 12/2015 | Houston | ............ | H02M 3/158 307/31 |
| 2016/0062425 A1* | 3/2016 | Cudak | ............ | G06F 1/26 713/300 |
| 2016/0241048 A1* | 8/2016 | Badam | ............ | H02J 7/0003 |
| 2016/0261132 A1* | 9/2016 | Uan-Zo-Li | ............ | H02J 7/0055 |
| 2016/0329737 A1* | 11/2016 | Yamamoto | ............ | H01L 31/02021 |
| 2017/0279275 A1* | 9/2017 | Yamamoto | ............ | H02J 3/32 |
| 2017/0294691 A1* | 10/2017 | Yamamoto | ............ | H01M 10/482 |
| 2017/0337025 A1* | 11/2017 | Finnan | ............ | G06F 3/1423 |
| 2018/0076647 A1* | 3/2018 | Wei | ............ | H02J 7/0065 |
| 2018/0097364 A1* | 4/2018 | Kato | ............ | H02J 3/32 |

OTHER PUBLICATIONS

"Bi-Directional Non-Isolated Buck Boost Converter", http://web.archive.org/web/20151010014423/http://www.ti.com/tool/tidm-buckboost-bidir, Oct. 10, 2015, 3 pages.

Hsiao, John, "Battery Charging Technology", https://training.ti.com/system/files/docs/John Hsiao_Battery Charging Technology_Industrial seminar_Taiwan.pdf, May 2015, 49 pages.

Chin, Spencer, "Single-Chip Buck-boost Charger Replaces Dual-Chip Solutions", http://electronics360.globalspec.com/article/6347/single-chip-buck-boost-charger-replaces-dual-chip-solutions, Feb. 22, 2016, 2 pages.

* cited by examiner

DYNAMIC POWER MANAGEMENT IN A HYBRID DUAL BATTERY SYSTEM

BACKGROUND

As portable computers have become more integrated into society, consumer demand has prompted an evolution towards increased flexibility. One such flexibility has focused on adoption of hybrid personal computers (PCs) that combine the capabilities of traditional laptops and the flexibility of tablet PCs. To that end, PC manufacturers are developing computers that may operate in both a traditional laptop setting (e.g., a computer and display with an attached keyboard) and a tablet setting (e.g., a display and/or touchscreens that does not have a separate keyboard).

Due in part to their mobile nature, portable computers are typically equipped with one or more batteries to function as a power source for the PC, for example, when the PC is not connected to a wall outlet. Due to its separable nature, a hybrid PC may include separate batteries, e.g., one associated with the keyboard and one associated with the display. Conventional systems, however, lack techniques to efficiently manage the shared power between the multiple batteries for a hybrid PC that may frequently transition between the laptop setting and the tablet setting. Further, conventional systems fail to adapt to the power requirements for different workloads when the device includes multiple processors (e.g., central processor unit (CPU) in the tablet and graphics processing unit (GPU) in the base portion that houses the keyboard).

SUMMARY

Implementations of the present disclosure provide apparatus and techniques for using an input current limit of a buck-boost narrow voltage direct current (NVDC) battery charger to manage power in a hybrid dual battery system. Particularly, in some examples, the integrated circuits of the NVDC battery charger may be used to dynamically steer power between the tablet portion (e.g., the touchscreen/display) and the base portion (e.g., the keyboard) in a hybrid PC by utilizing a charger input current limit as a control knob. Thus, the present disclosure provides techniques that may result in one or more of maximizing the battery run time of the computer system, maintaining component reliability by precisely controlling the current flow through various connectors and batteries, and maximizing the performance of one or more processors that may be included in the system.

In one example, a method, an apparatus, and a computer readable medium for managing power distribution in a device (e.g., hybrid PC) is disclosed. The techniques of the present disclosure may include determining a first power level of a first battery of the device, and determining a second power level of a second battery of the device. In some examples, the term "power level" may refer to the relative state of charge (RSOC) of the one or more battery that may be expressed as a percentage of available battery capacity of a battery cell and/or the discharge current from each battery. The discharge current information may assist the device understand the load of each battery such that the device may rebalance and steer the load appropriately. Aspects of the present disclosure may further adjust an input current limit of a system charger based on the first power level and the second power level. By adjusting the input current limit, the power management system may steer power from one or both of the first battery or the second battery to at least one processor of the device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
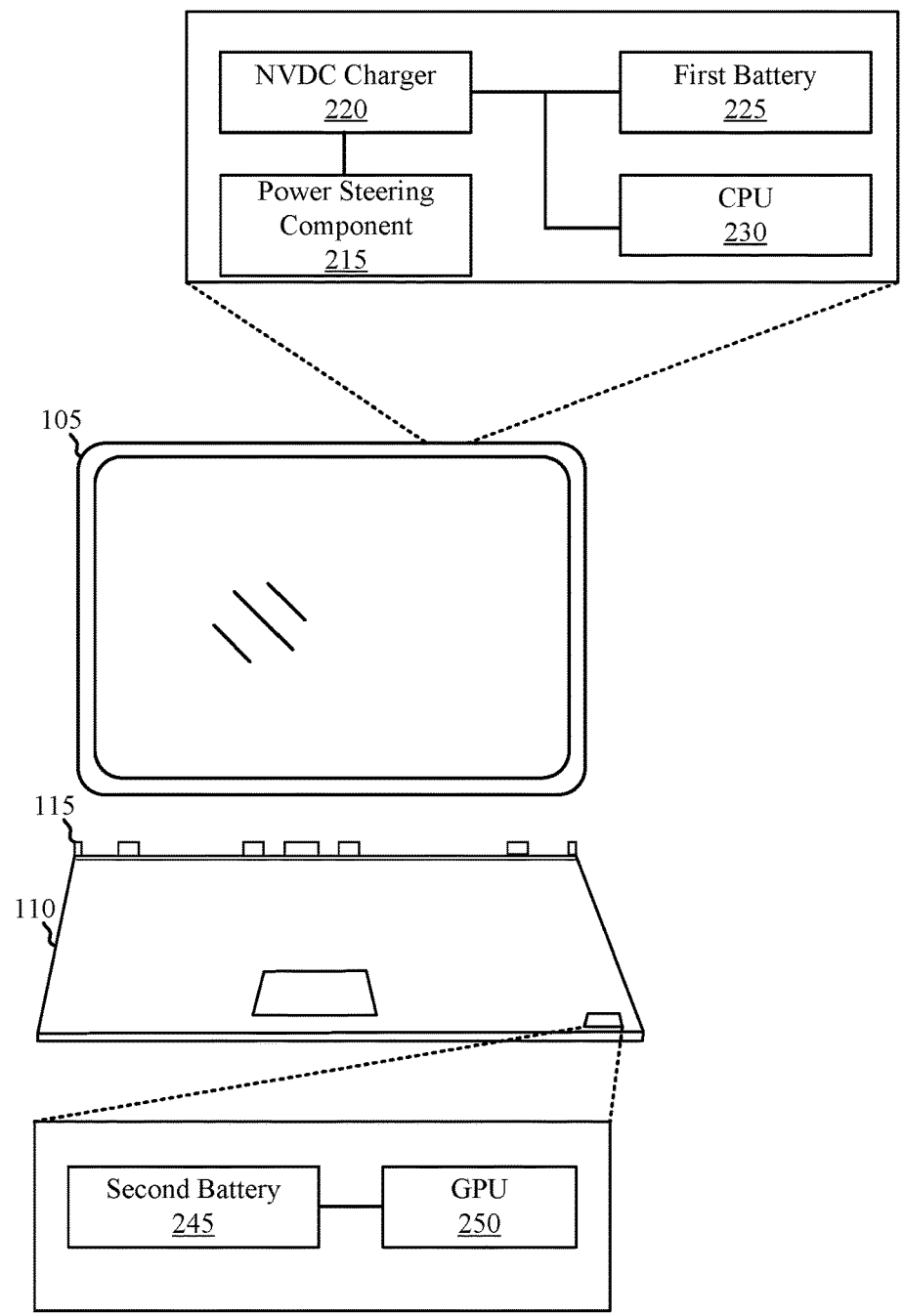
FIG. 1 is a schematic diagram of an example of a computer device in which features of the present disclosure may operate.

Computer devices, including portable computers such as hybrid PCs having a tablet portion separable from a base portion, may include a plurality of processors to distribute the one or more functions of the computer system. For example, a portable computer may include a combination of one or more central processing units (CPU) and graphics processing units (GPU). While the CPU may be responsible for performing the general functions of the computer itself, the specific GPU may be tasked with graphics processing. Such distribution of processing capabilities may optimize the overall performance of the portable computer. Because each processor may dissipate thermal energy, portable computers may separate the one or more processors within the computer system to minimize overheating any one portion of the computer. For example, in the hybrid PC architecture, the CPU may be included in the tablet portion, while the GPU may be separately included in the base portion (e.g., keyboard).

In order to provide a power source to each of the plurality of processors, portable computers may further include a plurality of batteries dispersed throughout the computer system. For example, at least one battery may be included in the tablet portion to support the power requirements of CPU, and similarly at least one battery may be included in the base portion to support the power requirements of the GPU.

The first generation hybrid PC systems typically use a simple diode OR topology to share power between at least two batteries of the portable computer. The simple diode OR topology, however, does not allow for precise control of the current flow from each battery. Thus, typically a battery with the higher source voltage and lower power path impedance to the load is more heavily used than a battery with a lower source voltage or higher power path impedance. As such, a smaller battery may be overloaded due to its higher source voltage, and the portable computer may rely on draining one battery at a greater rate than another battery in the portable computer.

In some examples, even when there is sufficient power available for the processor workload, performance of the portable computer may be adversely impacted due to poor allocation of power. Particularly, some workloads may be CPU intensive, while some may be GPU intensive. The lack of precise power management of the first generation hybrid PC systems may fail to ensure that the right amount of power is allocated to the right subsystem (i.e., CPU or GPU).

Moreover, because batteries, connectors, and cables within the portable computer all have current ratings, the lack of precise power management may also overload one or more components (e.g., batteries, connectors, or cables) of the portable computer. For example, if the CPU in the tablet portion is demanding a lot of power, and that power is supplied from the battery located in the base portion, the portable computer may risk overloading the connector that connects and transfers power and signals between the two portions of the portable computer.

Accordingly, the present disclosure provides techniques in a computer device having a dual battery system, such as in a hybrid PC, which use a bi-directional buck-boost NVDC charger on the tablet portion to handle battery power management between the two subsystems (i.e., tablet portion and base portion). Features of the present disclosure may dynamically adjust the input current limit of the charger to steer power between the tablet portion and the base portion in a hybrid PC. The precise power management control of the present disclosure may improve the battery run time of the computer system, may maintain component reliability by precisely controlling the current flow through various connectors and batteries, and may improve the performance of the one or more processors (e.g., CPU and GPU) by allocating the proper amount of power from the overall power budget.

Various aspects are now described in more detail with reference to the FIGS. 1-6. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Turning first to FIG. 1, a computer device 100 includes a tablet portion 105 and a base portion 110 that may be either detached (as shown) or attached using one or more connectors 115 in accordance with the hybrid 2-in-1 device architecture of the present disclosure. The one or more connectors 115 may include electrical connectors that provide an interface for power and electrical signals between the tablet portion 105 and the base portion 110. Further, the one or more connectors 115 may include mechanical and/or electro-mechanical connectors to removably attach the tablet portion 105 and the base portion 110. As noted, the computer device 100 may include one or more batteries to meet the power requirements of the plurality of components (e.g., CPU 230 and GPU 250). In some aspects, the plurality of batteries may be of varying size. For example, the computer device 100 may include a first battery 225 ("tablet battery") integrated into the tablet portion 105, and a second battery 245 ("base battery") included in the base portion 110 of the computer device 100. In some examples, the second battery 245 may be nearly double the size of the first battery 225. Although only two batteries are illustrated in FIG. 1, it should be appreciated that any combination of size and number of batteries may be included in the portable computer.

The computer device 100 may additionally include at least one processor (e.g., CPU 230 and GPU 250) to perform one or more functions of the computer. As noted, in order to minimize dissipation of thermal heat, the CPU 230 and the GPU 250 may be separated in different portions (e.g., tablet portion 105 and base portion 110) of the portable computer. While GPU 250 is described with reference to the present disclosure, one of ordinary skill in the art would appreciate that any processor may be included in the system to employ the disclosed power management techniques. In some examples, the system power consumption may vary dramatically based on different workloads, where some workloads may be CPU 230 intensive and some may be GPU 250 intensive.

In order to provide precise control of power distribution from one or more batteries, features of the present disclosure may utilize a power steering component 215 and a bi-directional buck-boost NVDC charger 220, which may be, for example, located on the tablet portion 105, to control and manage the supply of battery power between the two subsystems (i.e., tablet portion 105 and base portion 110). The power steering component 215 may be a microcontroller to perform one or more power management functionalities described herein. Particularly, the power steering component 215 adjusts an input current limit of the NVDC charger 220 to dynamically steer power from the first battery 225 and/or the second battery 245 between the two subsystems (i.e., tablet portion 105 and base portion 110) of the computer device 100. As is illustrated below in FIG. 2 (infra), the input to the NVDC charger 220 may be coupled to the second battery 245 such that the adapter 217 of the NVDC charger 220 will behave like an adapter for an alternate power source.

By adjusting the input current limits of the NVDC charger 220 (e.g., input current=0 amps (A), 1 A, 2 A, or 4 A), the power steering component 215 and NVDC charger 220 may control how much power is drained from the first battery 225 and/or the second battery 245 in order to meet the power requirements of the computer device 100 to perform one or more workloads. Thus, as the workload requirements of the one or more processors changes, and the power levels of the first battery 225 and the second battery 245 are reduced, the power steering component 215 and NVDC charger 220 may either increase or decrease the input current limit in order to steer power from the correct battery to the correct processor (i.e., steer power to the processor that has a greater workload from a battery whose RSOC is greater).

Figure 2:
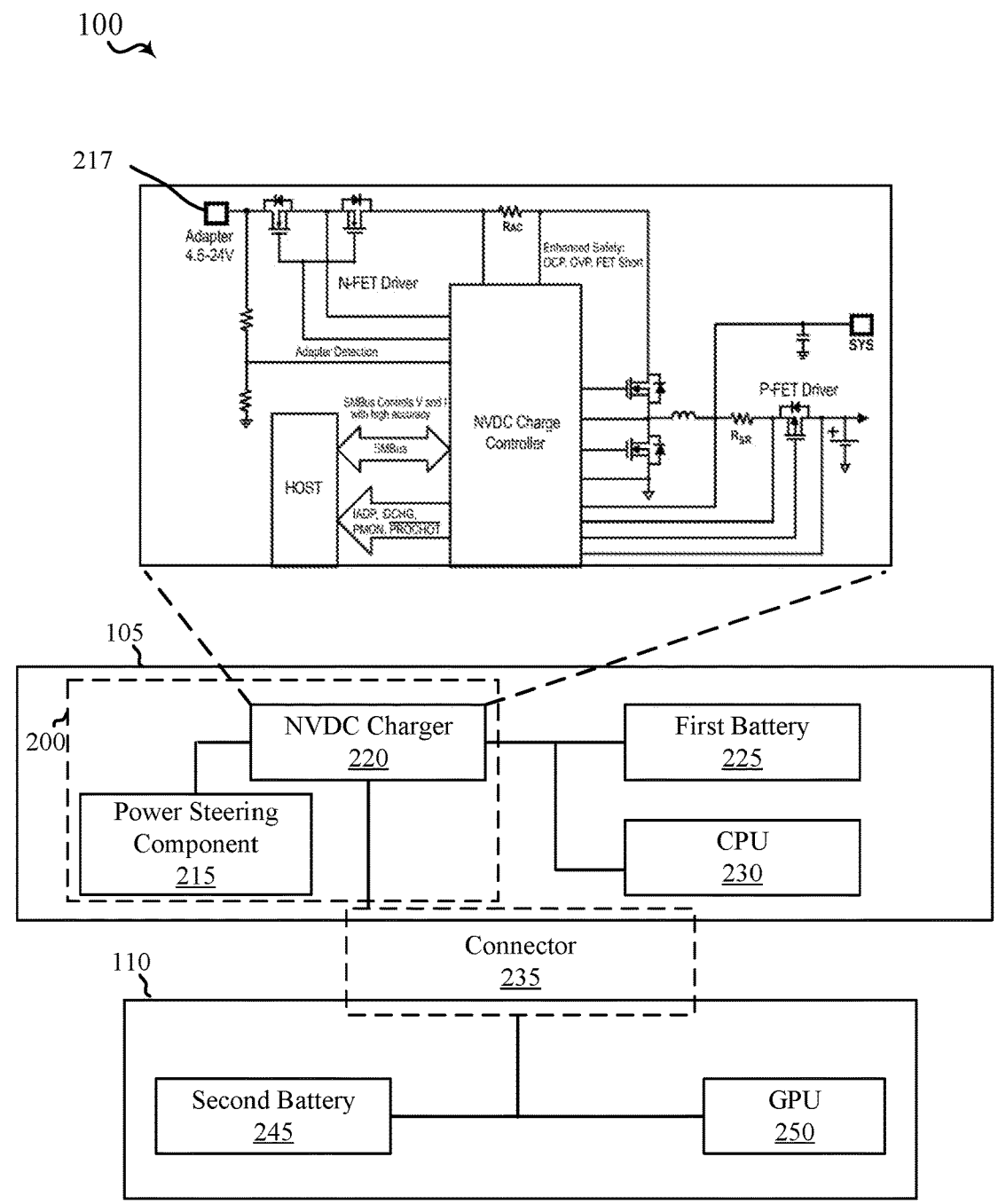
FIG. 2 is a schematic diagram of an example of a power management system in a computer device having a dual battery system having a dual battery system that, according to the present disclosure, uses a buck-boost NVDC charger to steer power between a tablet portion and a base portion of the computer device.

Referring to FIG. 2, in a more detailed view of an example power management system in computer device 100, such as a hybrid PC system, the power management system uses buck-boost NVDC charger 220 to steer power between the tablet portion 105 and the base portion 110. In some examples, the power management system 200 utilizes the power steering component 215 coupled to the NVDC charger 220 to dynamically adjust the input current limit of the NVDC charger 220.

As discussed above, the input of the NVDC charger 220 (e.g., adapter 217) may be coupled to the second battery 245 such that the power steering component 215 adjusting the input current limit of the NVDC charger 220 may affect the current flow out of the second battery 245. By either increasing or decreasing the power distribution from the second battery 245, the power steering component 215 and the NVDC charger 220 may also control amount of power that is drained from the first battery 225 to meet one or more workloads of the computer device 100. For example, as the input current limit of the NVDC charger 220 is increased (e.g., from 1 A to 4 A), more power may be steered from the second battery 245 to supply the power requirements of the CPU 230 and/or the GPU 250. As such, the power steering component 215 and the NVDC charger 220 may control the system such that the first battery 225 provides for any power requirements that are not met by the second battery 245. Additionally or alternatively, the power steering component 215 may also reverse the power flow from the first battery 225 to supply power to the base portion (e.g., GPU 250) when the relative state of charge (RSOC), e.g., power level, of the second battery falls below a minimum power threshold.

In some aspects, the connector 235 may couple the tablet portion 105 with the base portion 110 such that the power flow from one subsystem may flow to the other subsystem. However, because the connector 235 may have a current rating, it may be important for the power steering component 215 to manage the power flow between the two batteries and the two subsystems as not to overload the connector 235.

Thus, aspects of the present disclosure provide techniques to manage power distribution from one or more batteries of the hybrid PC system such that as the power levels of each respective batteries drops and/or the workload shifts between the CPU 230 and the GPU 250, the power steering component 215 may manage the power management system 200 in order to maximize the battery run time, maintain component reliability, and achieve efficient performance from the CPU 230 and the GPU 250 by properly allocating the power.

Figure 3A:
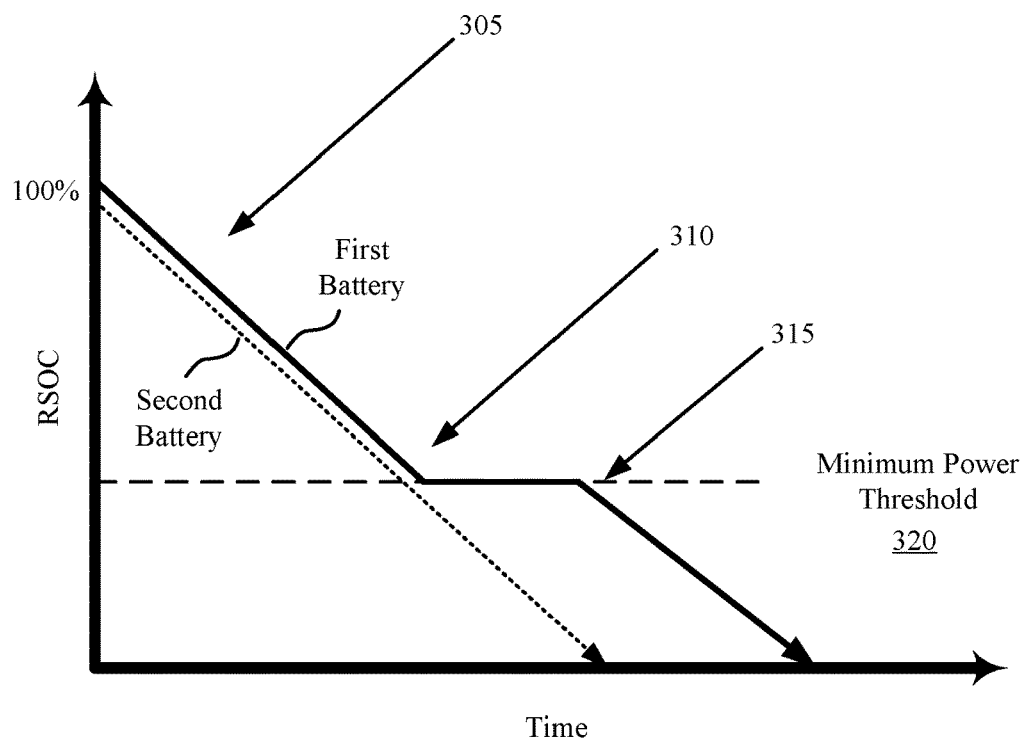
FIG. 3A is a graph of relative state of charge (RSOC) over time for an example of the power steering component managing power distribution in a computer device having a dual battery system in which the power from the two batteries is distributed evenly until at least one battery reaches the minimum power threshold.

Referring to FIG. 3A, graph 300 includes a solid line representing a relative state of charge (RSOC) over time, or discharge rate, of the first battery 225, and a dashed line representing an RSOC or discharge rate of the second battery 245, in an example of the operation of the power steering component 215 for managing power distribution in a computer device having a dual battery system, such as a hybrid PC.

At the onset, as illustrated at state 305, the power levels (or RSOC) of the first battery 225 and the second battery 245 may be greater than the minimum power threshold 320. During such instances, the power steering component 215 may dynamically adjust the input current limits of the NVDC charger 220 to ensure that the two batteries discharge at substantially equal rate. However, because the discharge rates and the power distribution of the system may not be precise, it may be difficult to achieve identical discharge rates. Therefore, aspects of the present disclosure account for the slight variations that may be observed in the power distribution by adjusting the input current limit of the NVDC charger 220 such that a discharge rate of the first battery 225 is within a predetermined range of the discharge rate of the second battery 245.

However, in some examples, when the first battery reaches (or is less than) the minimum power threshold 320, as illustrated by state 310, the power steering component 215 may hold or maintain the first battery 225 at the minimum power threshold levels (e.g., 20% RSOC), while adjusting the input current limit such that at least the CPU 230 and/or the GPU 250 are primarily supplied power by the second battery 245. At state 315, when the RSOC of the second battery 245 is nearly drained (e.g., when the RSOC of second battery 245 falls below a critical threshold that is less than the minimum power threshold), the power steering component 215 may readjust the input current limit such that the system is supplied power using the first battery 225. By employing the techniques described herein, the battery life of the computer device 100 may be maximized while minimizing disruption to user experience. In one or more examples, as described below, when at least the first battery power level and/or the second battery power level fall below the critical threshold, the computer device may selectively shut down (or turn off) the second processor (e.g., GPU 250) in order to conserve power for the first processor (e.g., CPU 230).

Figure 3B:
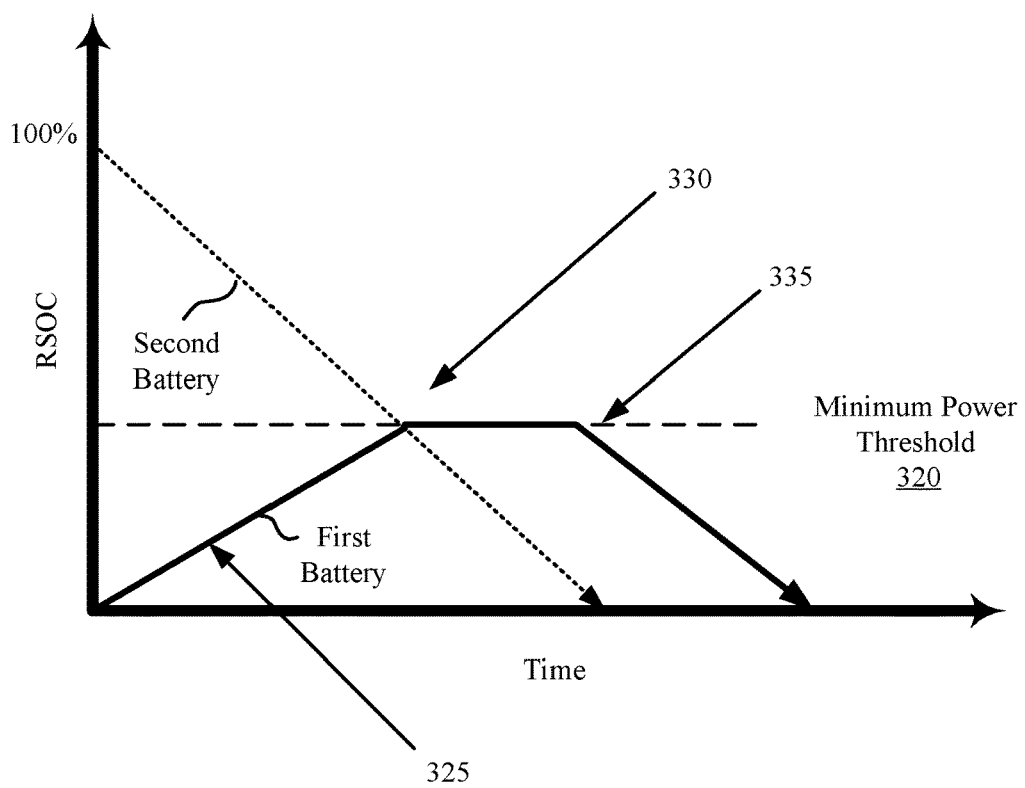
FIG. 3B is a graph of RSOC over time for an example of the power steering component managing power distribution in a computer device having a dual battery system in which the base battery (second battery) is used to cross charge the tablet battery (first battery) until the tablet battery reaches a minimum power threshold.

Referring to FIG. 3B, an example a graph 350 of RSOC over time for first battery 225 and second battery 245 when the power steering component 215 in collaboration with the NVDC charger 220 may cross charge the first battery 225 (e.g., tablet battery) using the power supplied by the second battery 245 (e.g., base battery).

At the onset, as illustrated by state 325, the RSOC of the second battery (e.g., 75%-100% RSOC) may be greater than the minimum power threshold, while the RSOC of the first battery (e.g., 0%-10% RSOC) may be less than the minimum power threshold. Because the tablet portion 105 that includes the first battery may independently support one or more processes (e.g., detaching feature that allows the user to communicatively separate the tablet from the base), the power steering component 215 may determine whether to cross charge the first battery using the power supplied by the second battery. Such a situation may arise, for example, when a user has been using the computer device 100 in a tablet mode with the base separated and returns to reattach the tablet portion 105 to the base portion 110. Since the base portion 110 may not have been used during the tablet mode (and/or the base may have been left plugged into a wall adapter), the power levels of the two batteries may be vary significantly.

In such situation, the power steering component 215 may enable cross charge of the first battery 225 using power from the second battery 245 until the RSOC of the first battery 225 reaches at least a minimum power threshold (e.g., 20% RSOC) as illustrated at state 330. At state 330, the power steering component 215 may adjust the input current limit of the NVDC charger 220 such that the computer device 100 is primarily supplied with power using the first battery 225, while the second battery 245 is preserved until state 335. At state 335, when the second battery 245 is completely (or nearly) drained (e.g., if the second battery 245 falls below a critical power threshold that may be less than the minimum power threshold), the input current limit of the NVDC charger 220 may again be adjusted (e.g., by decreasing the input current limit) such that the power requirements of the computer device 100 are supplied by the first battery 225.

In some cases, it may be important to minimize the use of cross charge feature as the net power loss realized by draining the second battery 245 to charge the first battery 225 may outweigh the benefits achieved. For example, due to path loss and the distance between the two batteries, the transfer of power from one battery to the other may not be proportional. Instead, in some circumstances, draining 15% of the second battery may yield only 7% gain at the first battery due to path loss. In such situations, it may be more prudent to forego cross charging the two batteries. Additionally or alternatively, the cross charging of the two batteries may be discouraged (or limited to only specific situations) because cross charging may add to the charge-discharge cycle of the battery and accelerate aging of the battery (e.g., reduce the effective lifespan of the battery). Further, due to the inefficiencies of battery charging and discharging, it may take more than 1 Watt-hour (Wh) of energy from one battery to charge the other battery 1 Wh. Accordingly, the power steering component 215, in some aspects, may determine whether to cross charge the first battery 225 using the power supplied by the second battery 245 based on calculation of net gain or loss that may be achieved by the cross charging prior to initiating the power steering from the second battery 245 to the first battery 225.

Figure 4A:
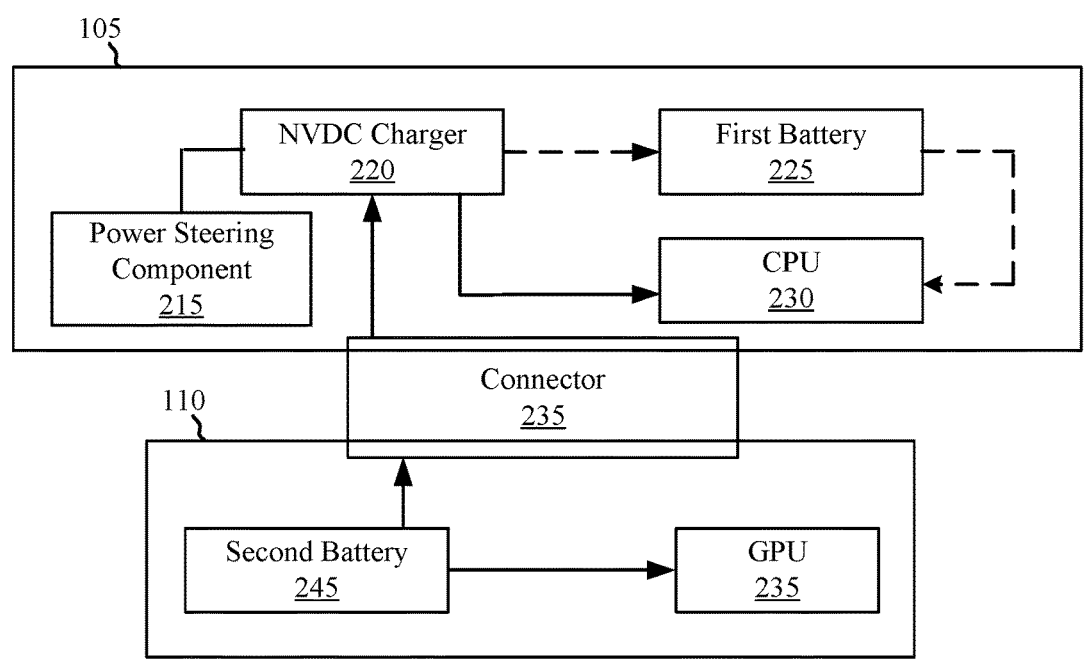
FIG. 4A is a schematic diagram of an example architecture of a computer device having a dual battery system according to the present disclosure, including arrows indicating a flow of power when the base battery supplies power to the computer device, including at least the CPU 230 and the GPU 235.

Referring to FIG. 4A, diagram 400 includes solid lines with arrows representing a flow of power in an example computer device 100 having power management system 200. In the illustrated example, power management system 200 operates to steer power from the second battery 245 to at least the first processor (e.g., CPU 230) and the second processor (e.g., GPU 250) when the RSOC of the first battery 225 is less than a minimum power threshold. Thus, in some examples, FIG. 4A illustrates a schematic diagram of power flow when at least one battery reaches a minimum power threshold 320 as illustrated in FIG. 3A. In such situations, the power steering component 215 may adjust the input current limit of the NVDC charger 220 (e.g., increase the input current limit from 1 A to 4 A), such that the power load requirements of the computer device 100 are primarily provided by the second battery 245. Any power deficient requirements may optionally be supported by the first battery 225, as illustrated by the dashed arrow from the first battery 225 to the CPU 230.

In limited circumstances, the power steering component 215 may additionally or alternatively configure the second battery 245 to cross charge the first battery 225 via the NVDC charger 220 (as shown by dashed line from the NVDC charger 220 to the first battery 225) when the first battery RSOC is less than the minimum power threshold, while the second battery RSOC is greater than the minimum power threshold. The cross charge may be utilized to recharge the first battery 225 to at least the minimum power threshold limits so that some critical functions that may be unique to the tablet portion 105 (e.g., communicatively detaching from the base portion) may be preserved.

Figure 4B:
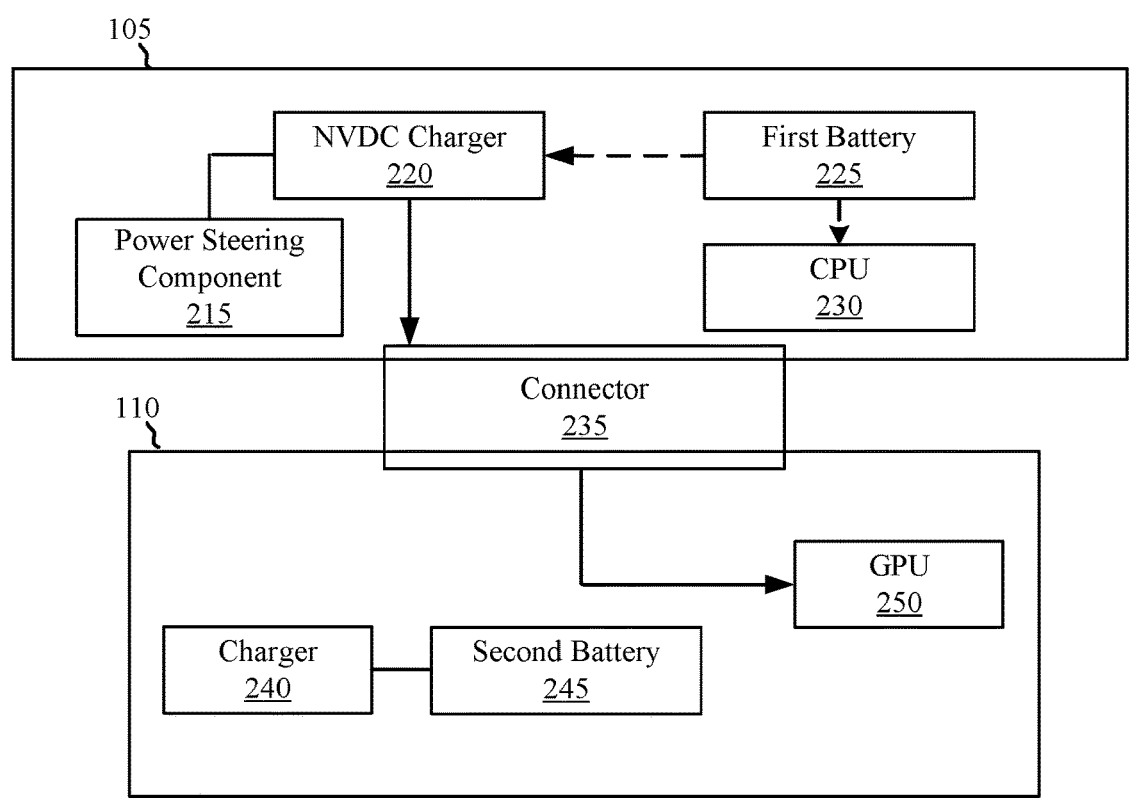
FIG. 4B is a schematic diagram of an example architecture of a computer device having a dual battery system according to the present disclosure, including arrows indicating a flow of power with the tablet portion battery powering the entire system when the relative state of charge (RSOC) of the base battery is below a critical power threshold.

Referring to FIG. 4B, diagram 450 includes solid lines with arrows that represent the power flow from the first battery 225 (e.g., tablet battery) supplying power to the entire computer device 100 when the computer device 100 is in an on-the-go (OTG) mode. Specifically, the OTG mode may be triggered when the second battery 245 (e.g., base battery) falls below a critical power threshold, while the power level of the first battery 225 is still greater than the minimum power threshold. The critical power threshold (e.g., 3% RSOC) may be less than the minimum power threshold (e.g., 20% RSOC). In such situations, the power steering component 215 may dynamically adjust the input current limit (e.g., charger input current limit=0 amps (A), 1 A, 2 A, or 4 A) to steer power from the first battery 225 to both the CPU 230 and the GPU 250. If, while supplying power to the entire system, the first power level of the first battery 225 falls below a minimum power threshold, the computer device 100 may shut off the GPU 250 in order to maximize battery life of the first battery 225. In some examples, this may be accomplished by the power steering component 215 signaling to the GPU 250 to terminate all workloads, and subsequently adjusts the input current limit of the NVDC charger 220 as to deprive the GPU 250 of power from the first battery 225.

Figure 5:
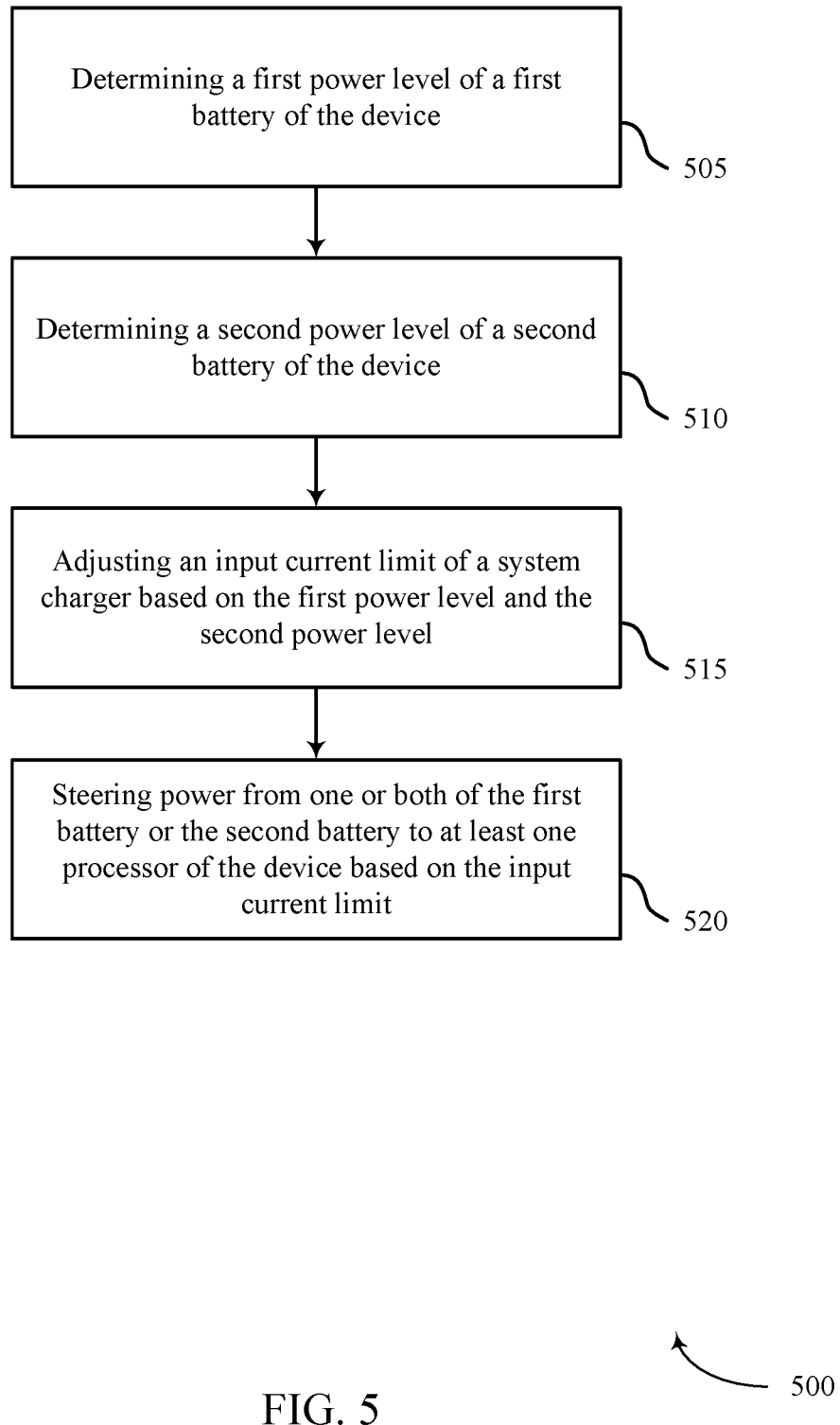
FIG. 5 is a flow chart of an example method implemented on a computer device in accordance with the present disclosure.

Referring to FIG. 5, an example method 500 for managing power in a computer device having a dual battery system, such as in a hybrid PC. The method 500 may be performed by the computer device 100 as described with reference to FIGS. 1-5. Although the method 500 is described below with respect to the elements of the computer device 100, other components may be used to implement one or more of the steps described herein.

At block 505, the method 500 may include determining a first power level of a first battery of the device. In some aspects, the block 505 may be performed by the power steering component 215 operating a battery charge manager 630, as described with reference to FIG. 6. In a non-limiting example, the battery charge manager 630 may determine the power level or remaining SOC of the first battery 225 by either direct measurement (e.g., measuring the battery discharge rate over a time period) or voltage based SOC estimation (e.g., using the voltage of the battery cells as the basis for calculating SOC or the remaining capacity).

At block 510, the method 500 may include determining a second power level of a second battery of the device. In some examples, the first power level and the second power level may be determined by the state of charge (SOC) estimation that may quantify the short term capability (e.g., the amount of energy left in a battery) of the one or more batteries of the computer device. In some examples, determining the "power level" may refer to one or both of RSOC of the one or more batteries that may be expressed as a percentage of available battery capacity of a battery cell and/or the discharge current from each battery. The discharge current information may assist the power steering component 215 and NVDC charger 220 understand the load of each battery (e.g., first battery 225 and the second battery 245) such that the device may rebalance and steer the load appropriately. In some aspects, the block 510 may also be performed by the power steering component 215 operating the battery charge manager 630 described with reference to FIG. 6.

As noted above, in a non-limiting example, the battery charge manager 630 may determine the power level or remaining SOC of the second battery 245 by either direct measurement (e.g., measuring the battery discharge rate over a time period) or voltage based SOC estimation (e.g., using the voltage of the battery cells as the basis for calculating SOC or the remaining capacity).

At block 515, the method 500 may include adjusting an input current limit of a system charger based on the first power level and the second power level. In some examples, the input current limit adjustor 635 may adjust the input current limit of the system charger may comprise determining whether the first power level of the first battery 225 and the second power level of the second battery 245 satisfies a minimum power threshold. If both the first power level and the second power level are greater than the minimum power thresholds, the input current limit adjustor 635 may adjust the input current limit of the system charger (e.g., NVDC charger 220) such that a discharge rate of the first battery 225 is within a predetermined range of the discharge rate of the second battery 245 (i.e., the computer device discharges both batteries substantially at the same rate so that one battery is not draining significantly faster than the other). Specifically, because the discharge rate and power disbursement may not be precise, it may be difficult to ensure that both batteries discharge identically. Therefore, the power steering component 215 may dynamically (and continuously) adjust the input current limit of the NVDC charger to maintain the discharges from the two batteries within a predetermined range.

Additionally or alternatively, if the first battery 225 (e.g., battery in the tablet portion 105) falls below the minimum power threshold, the power steering component 215 may steer power from the second battery 245 (e.g., battery in the base portion 110) to supply power to the CPU 230 and/or GPU 250. Thus, in some examples, when the battery charge manager 630 determines that the first power level is less than a minimum power threshold, the input current limit adjustor 635 may adjust the input current limit of the NVDC charger 220 by increasing the input current limit such that the second battery 245 (or base battery) supplies power to both the first processor (e.g., CPU 230) and the second processor (e.g., GPU 250). In some examples, the input current limit may be a setting configuration of the NVDC charger 220 that is adjusted in order to steer the power from one subsystem to another. If, however, the first power level is greater than the minimum power threshold, the input current limit adjustor 635 may adjust (e.g., by decreasing or increasing) the input current limit of the NVDC charger 220 in order to ensure that both the first battery 225 and the second battery 245 continue to discharge at the same rate.

In yet further examples, if the second battery 245 (e.g., base battery in the base portion 110) falls below the minimum power threshold (e.g., less than 20% RSOC), the power steering component 215 may adjust the input current limit (e.g., by decreasing the input current limit) of the NVDC charger such that the disbursement from the second battery can be limited (e.g., power load reduced), while the first battery 225 absorbs greater power load of the system (e.g., when the first battery power level is still greater than the minimum power threshold) by supplying power to the first processor and/or the second processor. In some examples, when the second power level of the second battery 245 falls further below a critical power threshold (e.g., less than 3% RSOC), the computer device 100 may shutdown the GPU 250 (e.g., first processor or the second processor) in order to maximize the battery life of the first battery that may supply power to the CPU 230 and other components of the computer device.

At block 520, the method 500 may include steering power from one or both of the first battery or the second battery to at least one processor of the device based on the input current limit. In some aspects, the block 520 may be performed by the power steering component 215 in connection with the NVDC charger 220 described with reference to FIGS. 2 and 6. The power steering component 215 and the NVDC charger 220 may steer power using the input current limit 222 (see FIG. 6) of the NVDC charger 220 by limiting the current limits at the adapter 217. As the input current limit of the NVDC charger 220 is increased, the NVDC charger 220 draws more power from the second battery 245 (base battery) while draining only the amount that is deficient from total power consumption requirements from the first battery 225 (tablet battery). In contrast, as the input current limit of the NVDC charger is decreased, the NVDC charger 220 limits the power drain from the second battery 245, and thus relying more on the first battery for the computer device's power requirements.

In yet further examples, the power steering component 215 may cross charge the first battery 225 using the power supplied by the second battery 245, as illustrated in FIG. 3B. For example, when the first power level of the first battery is less than a minimum power threshold, while the second power level of the second battery is greater than the minimum power threshold (see FIG. 3B, state 325), the power steering component 215 may steer power from the second battery to charge the first battery. In some examples, the first battery may be charged by the second battery until the first battery reaches or satisfies the minimum power threshold. Once the first battery reaches at least the minimum power threshold, the power steering component 215 may cease cross charging between the two batteries.

Figure 6:
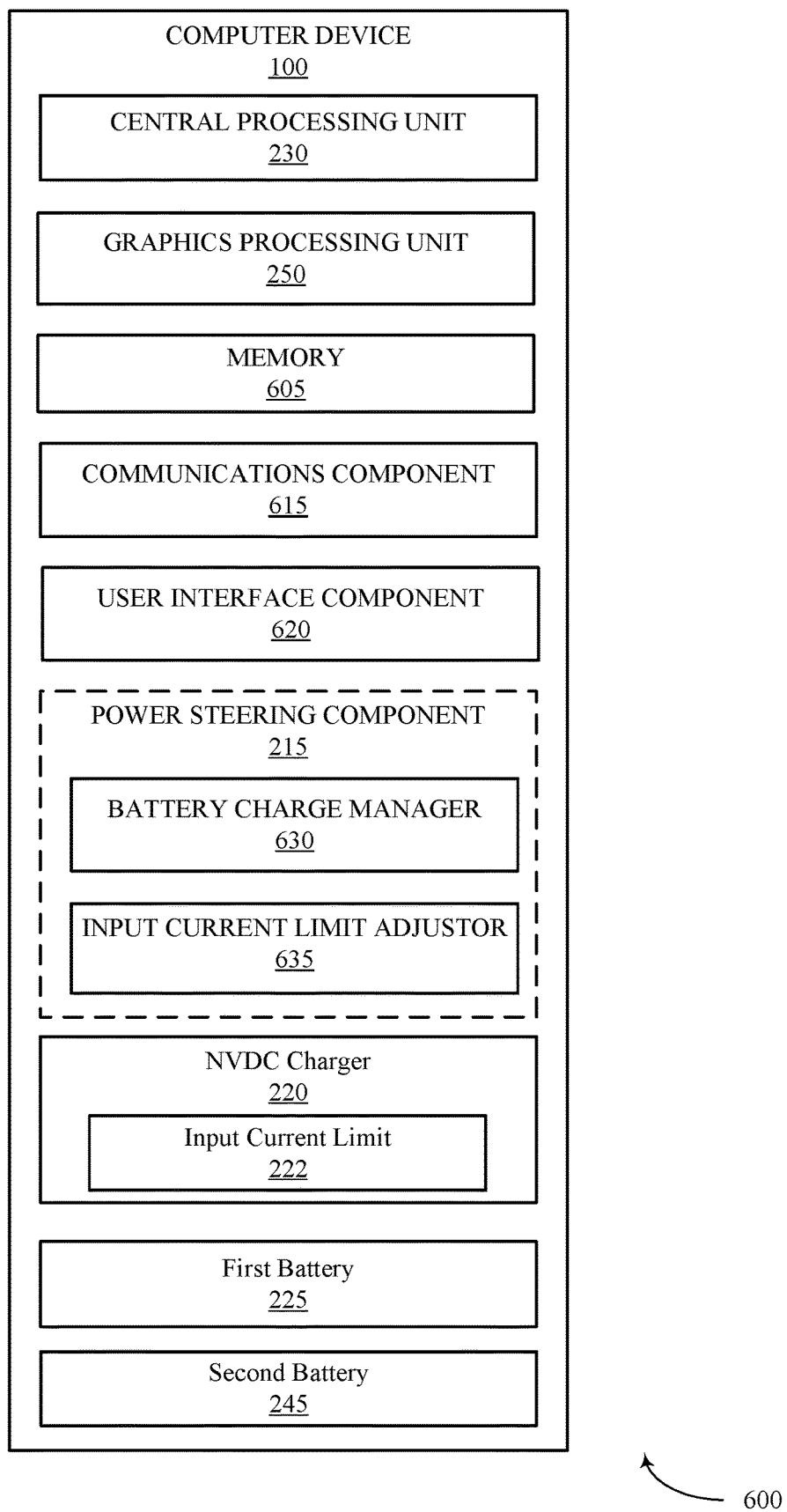
FIG. 6 is a schematic diagram of an example of a hardware implementation for a computer device in accordance with the present disclosure.

Referring now to FIG. 6, an example computer device 100 in accordance with the present disclosure may be an example of the computer device 100 described with reference to FIG. 1. Although in FIG. 6, one or more components are illustrated as part of a single computer device 100, those of ordinary skill would appreciate that one or more components may be included in either the tablet portion 105 or the base portion 110 of the computer device 100. For example, the CPU 230, the memory 605, and power steering component 625 may be included in the tablet portion 105, while the GPU 250 and the communications component 615 may be included in the base portion 110.

In some examples, the computer device 100 may include a CPU 230 for carrying out processing functions associated with the one or more components and functions, including but not limited to the power steering component adjusting the input current limit of the NVDC charger 220 in order to steer power depending the overall system power load. Additionally or alternatively, the computer device 100 may also include a GPU 250 for graphics and image processing. Although a GPU 250 is identified as one example, it should be appreciated that any specialized electronic circuit for processing blocks of data may be implemented herein. One or both of CPU 230 and GPU 250 may include a single or multiple set of processors or multi-core processors. Moreover, CPU 230 and GPU 250 can be implemented as an integrated processing system and/or a distributed processing system.

The computer device 100 may further include memory 605, such as for storing local versions of applications being executed by one or both of CPU 230 and GPU 250. In some aspects, the memory 605 may be implemented as a single memory or partitioned memory such that both the tablet portion 105 and the base portion 110 have access to memory 605 when the two portions are separated as illustrated in FIG. 1. In some examples, the operations of the memory 605 may be managed by the CPU 230 and GPU 250. Memory 605 can include a type of memory usable by a computer, such as random access memory (RAM), read only memory (ROM), tapes, magnetic discs, optical discs, volatile memory, non-volatile memory, and any combination thereof. Additionally, CPU 230, GPU 250, and memory 605 may include and execute operating system (not shown).

Further, computer device 100 may include a communications component 615 that provides for establishing and maintaining communications with one or more parties utilizing hardware, software, and services as described herein. Communications component 615 may carry communications between components on computer device 100, as well as between computer device 100 and external devices, such as devices located across a communications network and/or devices serially or locally connected to computer device 100. For example, communications component 615 may include one or more buses, and may further include transmit chain components and receive chain components associated with a transmitter and receiver, respectively, operable for interfacing with external devices.

Computer device 100 may also include a user interface component 620 operable to receive inputs from a user of computer device 100 and further operable to generate outputs for presentation to the user. User interface component 620 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 620 may include one or more output devices, including but not limited to a display, a speaker, a haptic feedback mechanism, a printer, any other mechanism capable of presenting an output to a user, or any combination thereof.

The computer device 100 may also include power steering component 215 that may be coupled to and in communication with NVDC charger 220 to manage power disbursement of one or more batteries that supply power to the computer device 100. In some examples, the power steering component 215 may use the input current limit of the NVDC charger 220 to dynamically steer power to one or both of CPU 230 and/or GPU 250 based on the overall system power load and the battery power levels (e.g., RSOC). To that end, the power steering component 215 includes a battery charge manager 630 that monitors the relative state of charge of the one or more batteries of the computer device 100. The battery charge manager 630 may inform the input current limit adjustor 635 of the power levels of at least the first and second batteries such that the input current limit may be adjusted to steer power within the computer device 100.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 100), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for managing power distribution in a device, comprising:
   determining a first power level of a first battery of the device;
   determining a second power level of a second battery of the device;
   adjusting an input current limit of a system charger based on the first power level and the second power level; and
   steering power from one or both of the first battery or the second battery to at least one processor of the device based only on the input current limit, with the input current limit controlling which of the first battery, the second battery or both the first battery and the second battery is drained from and how much power is drained from the first battery, the second battery or both the first battery and the second battery.

2. The method of claim 1, wherein adjusting the input current limit of the system charger comprises:
   determining that the first power level of the first battery is greater than a minimum power threshold;
   determining that the second power level of the second battery is greater than the minimum power threshold; and
   adjusting the input current limit of the system charger such that a discharge rate of the first battery is within a predetermined range of the discharge rate of the second battery.

3. The method of claim 1, wherein adjusting the input current limit of the system charger comprises:
   determining that the first power level is less than a minimum power threshold; and
   increasing the input current limit of the system charger based on the determining.

4. The method of claim 3, wherein the at least one processor includes a first processor and a second processor; and wherein increasing the input current limit of the system charger allows the second battery to supply power to both the first processor and the second processor.

5. The method of claim 1, wherein adjusting the input current limit of the system charger comprises:
determining that the first power level is greater than a minimum power threshold; and
adjusting the input current limit of the system charger based on the determining.

6. The method of claim 1, wherein adjusting the input current limit of the system charger comprises:
determining that the second power level is less than a minimum power threshold; and
decreasing the input current limit of the system charger based on the determining.

7. The method of claim 1, wherein the at least one processor includes a first processor and a second processor; and the method further comprises:
determining that the second power level is less than a critical power threshold; and
shutting off the first processor or the second processor based on the determining.

8. The method of claim 1, further comprising:
determining that the first power level of the first battery is less than a minimum power threshold;
determining that the second power level of the second battery is greater than the minimum power threshold; and
steering power from the second battery to the first battery until the first battery satisfies the minimum power threshold.

9. A computer device for managing power distribution in a device comprising:
a first processor;
a second processor; and
a memory coupled to the first processor and the second processor, the memory including instructions executable by the first processor or the second processor to:
determine a first power level of a first battery of the device;
determine a second power level of a second battery of the device;
adjust an input current limit of a system charger based on the first power level and the second power level; and
steer power from one or both of the first battery or the second battery to one or both of the first processor or the second processor of the computer device based only on the input current limit, with the input current limit controlling which of the first battery, the second battery or both the first battery and the second battery is drained from and how much power is drained from the first battery, the second battery or both the first battery and the second battery.

10. The computer device of claim 9, wherein the instructions to adjust the input current limit of the system charger are further executable to:
determine that the first power level of the first battery is greater than a minimum power threshold;
determine that the second power level of the second battery is greater than the minimum power threshold; and
adjust the input current limit of the system charger such that a discharge rate of the first battery is within a predetermined range of the discharge rate of the second battery.

11. The computer device of claim 9, wherein the instructions to adjust the input current limit of the system charger are further executable to:
determine that the first power level is less than a minimum power threshold; and
increase the input current limit of the system charger based on the determining.

12. The computer device of claim 11, wherein increasing the input current limit of the system charger allows the second battery to supply power to both the first processor and the second processor.

13. The computer device of claim 9, wherein instructions to adjust the input current limit of the system charger are further executable to:
determine that the first power level is greater than a minimum power threshold; and
adjust the input current limit of the system charger based on the determining.

14. The computer device of claim 9, wherein instructions to adjust the input current limit of the system charger are further executable to:
determine that the second power level is less than a minimum power threshold; and
decrease the input current limit of the system charger based on the determining.

15. The computer device of claim 9, wherein the instructions are further executable to:
determine that the second power level is less than a critical power threshold; and
shut off the first processor or the second processor based on the determining.

16. The computer device of claim 9, further comprising:
determining that the first power level of the first battery is less than a minimum power threshold;
determining that the second power level of the second battery is greater than the minimum power threshold; and
steering power from the second battery to the first battery until the first battery satisfies the minimum power threshold.

17. A non-transitory computer-readable medium for managing power distribution in a device comprising instructions for:
determining a first power level of a first battery of the device;
determining a second power level of a second battery of the device;
adjusting an input current limit of a system charger based on the first power level and the second power level; and
steering power from one or both of the first battery or the second battery to at least one processor of the device based only on the input current limit, with the input current limit controlling which of the first battery, the second battery or both the first battery and the second battery is drained from and how much power is drained from the first battery, the second battery or both the first battery and the second battery.

18. The non-transitory computer-readable medium of claim 17, wherein the instructions for adjusting the input current limit of the system charger, further include instructions for:
determining that the first power level of the first battery is greater than a minimum power threshold;
determining that the second power level of the second battery is greater than the minimum power threshold; and adjusting the input current limit of the system charger such that a discharge rate of the first battery is within a predetermined range of the discharge rate of the second battery.

19. The non-transitory computer-readable medium of claim 17, wherein the instructions for adjusting the input current limit of the system charger, further include instructions for:

determining that the first power level is less than a minimum power threshold; and increasing the input current limit of the system charger based on the determining.

20. The non-transitory computer-readable medium of claim 19, wherein the at least one processor includes a first processor and a second processor; and wherein increasing the input current limit of the system charger allows the second battery to supply power to both the first processor and the second processor.

* * * * *